United States Patent [19]

Murata et al.

[11] 3,929,695
[45] Dec. 30, 1975

[54] PHENOLIC RESIN ADHESIVES CONTAINING RESORCINOL, FORMALDEHYDE AND AN ALKALI METAL CARBONATE

[75] Inventors: Takao Murata; Nobutaka Nakamura; Yukio Saeki, all of Fujieda, Japan

[73] Assignee: Sumitomo Durez Company, Ltd., Tokyo, Japan

[22] Filed: Jan. 29, 1973

[21] Appl. No.: 327,512

[52] U.S. Cl. .............. 260/17.5; 156/335; 260/17.2; 260/29.3; 260/51.5; 260/54
[51] Int. Cl.² ......................................... C08G 8/22
[58] Field of Search ................... 260/54, 51.5, 17.5

[56]  References Cited
UNITED STATES PATENTS

| | | | |
|---|---|---|---|
| 1,802,390 | 4/1931 | Novotny | 260/54 |
| 2,385,372 | 9/1945 | Rhodes | 260/54 |
| 2,429,369 | 10/1947 | Rhodes | 260/54 X |
| 2,478,943 | 8/1949 | Rhodes | 260/54 |
| 2,489,336 | 11/1949 | Spahr et al. | 260/54 |
| 2,502,511 | 4/1950 | Davies et al. | 260/54 |
| 2,513,274 | 7/1950 | Barkhuff | 260/54 X |
| 2,527,581 | 10/1950 | Searer et al. | 260/54 X |
| 2,541,688 | 2/1951 | Cardwell | 260/54 X |
| 2,589,286 | 3/1952 | Rhodes | 260/54 |
| 3,328,354 | 6/1967 | Dietrick | 260/54 |
| 3,599,433 | 8/1971 | Murata et al. | 260/51.5 |
| 3,696,622 | 10/1972 | Tohma et al. | 260/51.5 |

FOREIGN PATENTS OR APPLICATIONS 7,367,360    9/1973    Japan

OTHER PUBLICATIONS

Phenolic Resins, Whitehouse, pp. 85–86, 139, 1970.

*Primary Examiner*—Howard E. Schain
*Attorney, Agent, or Firm*—Peter F. Casella; James F. Mudd; David A. Stein

[57]  ABSTRACT

Rapidly curable and highly extendable phenolic resin adhesives are obtained by adding resorcinol, formaldehyde and an alkali metal carbonate to a water-soluble thermosetting phenolic resin at room temperature just before application of the adhesive to the surfaces to be bonded.

6 Claims, No Drawings

PHENOLIC RESIN ADHESIVES CONTAINING RESORCINOL, FORMALDEHYDE AND AN ALKALI METAL CARBONATE

BACKGROUND OF THE INVENTION

This invention relates to a novel phenolic resin adhesive. Further explained in detail, it is related to a method for preparing a rapidly curable and highly extendable phenolic resin adhesive which consists of adding a resorcinol, a formaldehyde and an alkali metal carbonate to a water-soluble thermosetting phenolic resin at room temperature just before its application.

As a water-soluble phenolic resin adhesive is generally prepared by reacting phenols such as phenol, cresols, etc. and aldehydes such as formaldehyde, acetaldehyde, etc. in a strong alkaline system, usual acid hardeners cannot be used as a hardening agent. Therefore, it is necessary to apply a higher temperature and longer time in its curing process when compared with other thermosetting resin adhesives such as urea resin or melamine urea co-condensation resin etc. Consequently, phenolic resin adhesives are markedly limited in their uses in spite of their remarkably excellent bonding strength, water resistance and durability, owing to the low productivity of their bonded products, for example, plywood, which require longer time for their adhesion.

Several methods are known in the art which relate to shortening the setting time of phenolic resin adhesives. First, there are methods which use various kinds of alkali metal hydroxides, water-soluble alkali metal weak acid salts, or water-insoluble multivalent metal carbonates as an accelerator of curing speed of phenolic resin under heat. These methods accelerate the thermosetting speed of phenolic resins, but they cannot shorten the setting time of water-soluble phenolic resin adhesives to the extent of that of urea resin or melamine-urea co-condensation resin adhesives.

The second group are methods which add resorcinol or resorcinol resin, or resorcinol and formaldehyde to phenolic resins just before their application. The methods of this group also accelerate the thermosetting speed of water-soluble phenolic resin, but the former case has a defect of markedly raising the price of adhesive by using a large quantity of expensive resorcinol, and in the latter case where resorcinol and formaldehyde are used together, the degree of accelerating the thermosetting speed is not comparable to the short curing time or urea resin or melamine-urea co-condensation resin, and moreover it increases the price of the prepared adhesive.

U.S. Pat. Nos. 3,328,354 and 3,389,125 describe adhesives wherein the resorcinol is incorporated in the phenolic resin.

SUMMARY OF THE INVENTION

We have found that when resorcinol, formaldehyde with alkali metal carbonate are added to water-soluble phenolic resin just before use of the glue at room temperature, the thermosetting speed of a watersoluble phenolic resin adhesive is remarkably accelerated and also the adhesive is rendered highly extendable by adding usual extenders without impairing its thermosetting speed and bonding strength. Therefore, by the present invention, the price of the prepared adhesive can be reduced by highly extending it with usual cheaper extenders in spite of using expensive resorcinol, and also the curing time can be shortened drastically.

DESCRIPTION OF PREFERRED EMBODIMENTS

Phenolic resins used in the present invention are water-soluble thermosetting condensation products which are made by reacting one or several kinds of hydroxy aromatic compounds (phenols) with one or several kinds of aldehydes by using an alkaline catalyst. Also, they include the resins in which urea or lignin were substituted for up to one half the phenols in the composition of phenolic resin. Phenols used generally are phenol, cresol, and other substituted phenols, and there are included in aldehyde substances such formaldehyde donors such as formalin, para-formaldehyde, $\alpha$-polyoxymethylene, etc., or aldehydes such as acetaldehyde, furfural, and the like having up to about 8 carbon atoms, but they are not limited within the scope mentioned here. Caustic soda is the most suitable practical alkaline catalyst, but caustic potash, barium hydroxide, etc., can also be included. As aqueous solvent, water is mostly suitable, but mixed solvents which consist of water and water-soluble lower alcohols, water and other water-soluble organic solvents are included. These aqueous solvents are used with solid contents of such phenolic resins, being within a range of between about 30 and 60 percent, preferably between about 35 and 50 percent.

The molar ratio of phenols to aldehydes for the preparation of water-soluble thermosetting phenolic resins used in the present invention are generally from about 1:1.5 to 1:3, preferably from about 1:1.7 to 1:2.5 and are reacted with an alkaline catalyst in aqueous solvents. On the other hand, it is preferable for the water-soluble phenolic resin which is suitable for the present invention to be stable for long term storage, therefore such a water-soluble phenolic resin is reacted until its free formaldehyde content becomes less than three (3) percent, preferably less than one (1) percent by weight.

Further, the phenolic resins used in the present invention include such a water-soluble thermosetting phenolic resin which is obtained by the following procedure: phenols and aldehydes are reacted in a range of molar ratio of about 1:0.65 to 1:0.90 by using acid catalyst, then more aldehydes are added until the range of molar ratio of phenols to aldehyde in total becomes about 1:1.5 to 1:3, preferably from about 1:1.7 to 1:2.5 with an alkaline catalyst.

Formaldehyde added at room temperature just before application of the adhesive in the present invention includes such formaldehyde donors as formalin, para-formaldehyde, $\alpha$-polyoxymethylene, etc., and it is preferable to use formalin or powdered para-formaldehyde from the standpoint of solubility, dispersibility, etc. The amount of formaldehyde to be added is based on the thermosetting speed of phenolic resin itself required for its application, and in general, are in a range from about one (1) to ten (10), preferably from about one (1) to five (5) parts for one hundred (100) parts of such a phenolic resin. Whereas the quantity of formaldehyde to be added is not limited from the standpoint of accelerating the thermosetting speed, it may be restricted from standpoints such as generating odor or shortening the pot life of the prepared adhesive by increase in viscosity during its application.

The quantity of resorcinol added in the present invention is not limited from the standpoint of accelerating thermosetting speed, but it is preferable to maintain the quantity in a range from about one (1) to five (5) parts to one hundred (100) parts of phenolic resin when considering the increase in price or the shortening of pot life of the adhesive caused by viscosity increase when applying it.

Alkali metal carbonates such as sodium carbonate, potassium carbonate are used in the present invention, and both are excellent in accelerating the thermosetting speed of phenolic resin. The quantity of alkali metal carbonate to be added is not limited from the standpoint of accelerating thermosetting speed, but, if it is added in excess, the drying of such an adhesive after coating is too fast and the allowable open time is shortened, so it is preferable to maintain it in a range from about one (1) to five (5) parts to one hundred (100) parts of phenolic resin.

In the present invention, the addition of resorcinol, formaldehyde and alkali metal carbonate to the phenolic resin is mostly effective at room temperature just before application of the adhesive. The phenolic resin with resorcinol, formaldehyde and alkali metal carbonate does not diminish its accelerated thermosetting speed when left standing; however, its viscosity increases gradually and it gradually becomes difficult to spread it, so it is desirable to add those additives into the phenolic resin at room temperature just before the coating process. The resorcinol, formaldehyde and alkali metal carbonate can be incorporated into the phenolic resin in a variety of methods. Thus, a premix of resorcinol and alkali metal carbonate under the required proportion can be added into the phenolic resin just before use, and the required formaldehyde can be added as a separate component. A method where para-formaldehyde used as a formaldehyde donor in the required proportion premixed with an extender such as walnut powder is added to the resin is also effective.

Usable extenders for the present invention include extenders which are generally used for aqueous adhesives: walnut powder, wood flour and other related cellulosic material powders, starch material such as wheat flour, corn flour and other cereal flours, and the like.

Bonding time required for the water-soluble phenolic resin adhesives prepared by the present invention is markedly shorter than usual water-soluble phenolic resin adhesives, and excellent bonding strength is obtained within bonding time equivalent to the usual urea resin adhesives or melamine-urea co-condensation resin adhesives, and moreover they can be extended to the same extent as the usual urea resin adhesives or melamineurea co-condensation resin adhesives with the same bonding time described above, and can be especially applied to plywood manufacture as an adhesive of reasonable price, rapid cure, excellent bonding strength. Moreover, the invention is applicable to usual phenolic resins on the market by adding resorcinol, formaldehyde and alkali metal carbonate at room temperature just before application of the adhesive. The mixing thereby is able to be carried out in usual mixing vessels.

Following examples are shown to explain in detail the effect and difference of the present invention from usual methods, but the present invention is not restricted by them. The "part" described herein refers to parts by weight and temperatures are in degrees centigrade unless otherwise specified.

EXAMPLE 1

Phenol and formaldehyde are reacted under reflux in a molar ratio of 2.0, using sodium carbonate as a catalyst, and a pH of about 11 until the viscosity of the product at 25°C becomes about 1.5 poise. As a result, we obtain a water-soluble phenolic resin with properties shown as follows:

| | |
|---|---|
| Gelation time (min/110°C) | 33 |
| Non-volatile matter (%) | 41 |
| Water tolerance (at 25°C) | more than 49 times |
| Free formaldehyde (%) | 0.7 |
| pH (at 25°C, glass electrode) | 10.8 |
| Viscosity (poise/25°C) | 1.6 |

The gelation time at 110°C of the adhesive mixture consisting of two (2) parts of resorcinol, para-formaldehyde and sodium carbonate respectively added to one hundred (100) parts of water-soluble phenolic resin described above was 11 minutes.

Then, five (5) samples of plywood were prepared under following conditions using the adhesive of Example 1.

1. Composition of Glue:

TABLE 1

| Glue No.<br>Composition | 1 | 2 | 3 | 4 | 5 |
|---|---|---|---|---|---|
| Phenolic resin | 100 | 100 | 100 | 100 | 100 |
| Resorcinol | 2 | 2 | 2 | 2 | 2 |
| Para-formaldehyde | 2 | 2 | 2 | 2 | 2 |
| Sodium carbonate | 2 | 2 | 2 | 2 | 2 |
| Walnut powder | 4 | 4 | 6 | 10 | 16 |
| Wheat flour | 0 | 4 | 6 | 10 | 16 |
| Water | 2 | 10 | 16 | 28 | 37 |
| Extended magnification for one part of phenolic resin | 1.12 | 1.24 | 1.34 | 1.54 | 1.75 |

2. Bonding conditions: Construction: Lauan veneer (thickness . . . 2mm, moisture content . . . less than 7%) 3 plies Glue spread: 30 - 33 gram/ft$^2$ Cold press (at 20°C): 10Kg/cm$^2$ 30 minutes Hot press (at 135°C): 10kg/cm$^2$ 2 minutes and 30 seconds*

*Note: Hot press time alloted per 1 mm thickness of veneer is 25 seconds.

Bonding strengths of plywoods thus obtained are shown in Table 2 as follows: (All numerical values are averages of twelve tests.)

TABLE 2

| Plywood Sample No.<br>Test | 1 | 2 | 3 | 4 | 5 |
|---|---|---|---|---|---|
| Wood failure by the knife test at normal conditions (%) | 97 | 93 | 93 | 97 | 87 |
| Bonding strength** (Kg/cm$^2$) | 19.6 | 20.8 | 20.3 | 18.3 | 17.6 |
| Wood failure** | 100 | 99 | 98 | 98 | 81 |

**Note: Results based on the "repeated boiling test" described in the Japan Agriculture and Forestry Standard.

EXAMPLE 2

The specification of the water-soluble phenolic resin on the market used herein is as follows:

| | |
|---|---|
| Gelation time (min./110°C) | 36 |
| Non-volatile matter (%) | 47 |
| Water tolerance (25°C) | more than 49 times |
| Free formaldehyde (%) | 0.9 |
| pH (at 25°C, glass electrode) | 10.5 |
| Viscosity (poise/25°C) | 2.1 |

Gelation times of the above-described adhesive to which resorcinol, formaldehyde and sodium carbonate were added at room temperature according to the following description were both shortened.

| | | |
|---|---|---|
| Phenolic resin | 100 | 100 |
| Resorcinol | 1 | 3 |
| Para-formaldehyde | 2 | 3.5 |
| Sodium carbonate | 3 | 2 |
| Gelation time (min./110°C) | 14 | 10 |

Four kinds of adhesives were also prepared according to the following formulae and plywood samples were prepared by the same procedure as described in Example 1.

Composition of glue:

TABLE 3

| Glue No.<br>Composition | 6 | 7 | 8 | 9 |
|---|---|---|---|---|
| Phenolic resin | 100 | 100 | 100 | 100 |
| Resorcinol | 1 | 3 | 1 | 3 |
| Para-formaldehyde | 2 | 3.5 | 2 | 3.5 |
| Sodium carbonate | 3 | 2 | 3 | 2 |
| Walnut powder | 5 | 4 | 10 | 10 |
| Wheat flour | 0 | 0 | 15 | 15 |
| Water | 0 | 5 | 28 | 35 |
| Extended magnification for one part of phenolic resin | 1.11 | 1.175 | 1.59 | 1.685 |

Bonding strengths of the plywoods obtained herein are shown in Table 4 as follows: (All numerical values are averages of twelve tests.)

TABLE 4

| Glue No.<br>Test | 6 | 7 | 8 | 9 |
|---|---|---|---|---|
| Wood failure by the knife test at normal conditions (%) | 97 | 100 | 95 | 98 |
| Bonding strength** (Kg/cm$^2$) | 20.3 | 19.0 | 18.8 | 20.4 |

TABLE 4-continued

| Glue No.<br>Test | 6 | 7 | 8 | 9 |
|---|---|---|---|---|
| Wood failure** | 86 | 100 | 96 | 93 |

**Note: Results based on the "repeated boiling test" of the Japan Agriculture and Forestry Standard.

As in the present example, similar results were also obtained when using potassium carbonate in place of sodium carbonate.

EXAMPLE 3

Urea and formalin were reacted 30 minutes at 100°C in a molar ratio of 1:2 at a pH of about 8.5 by using caustic soda as a catalyst, then phenol was further added with its molar ratio to urea being 2:1 and the whole mixture was further reacted 30 minutes at 100°C at a pH of less than 1 by adding hydrochloric acid. Further, formalin, with its molar ratio to the phenol described above being 2:1 was added and reacted 30 minutes at 100°C, at a pH of about 11 by adding caustic soda as a catalyst. The resin thus prepared had the following properties:

| | |
|---|---|
| Gelation time (min./110°C) | 35 |
| Non-volatile matter (%) | 47 |
| Water tolerance (25°C) | more than 49 times |
| Free formaldehyde (%) | 0.9 |
| pH (at 25°C, glass electrode) | 11.2 |
| Viscosity (poise/25°C) | 2.6 |

Gelation time of the adhesives which were prepared by mixing resorcinol, formaldehyde and sodium carbonate and the above-described water-soluble phenolic resin at room temperature, were all shortened:

| | | |
|---|---|---|
| Urea-modified phenolic resin | 100 | 100 |
| Resorcinol | 2 | 3 |
| Para-formaldehyde | 2 | 3.5 |
| Sodium carbonate | 2 | 1 |
| Gelation time (min./110°C) | 12 | 10 |

Adhesives for plywood were prepared as described below, and four kinds of corresponding plywood samples were also prepared with the same bonding conditions as described in Example 1.

Composition of glue:

TABLE 5

| Glue No. Composition | 10 | 11 | 12 | 13 |
|---|---|---|---|---|
| Urea-modified phenolic resin | 100 | 100 | 100 | 100 |
| Resorcinol | 2 | 3 | 2 | 3 |
| Para-formaldehyde | 2 | 3.5 | 2 | 3.5 |
| Sodium carbonate | 2 | 1 | 2 | 1 |
| Walnut powder | 4 | 4 | 10 | 10 |
| Wheat flour | 0 | 0 | 10 | 10 |
| Water | 2 | 5 | 30 | 35 |
| Extended magnification for one part of phenolic resin | 1.12 | 1.165 | 1.56 | 1.625 |

Bonding strengths of plywood samples obtained herein are shown in Table 6 as follows: (All numerical values are averages of twelve tests.)

TABLE 6

| Plywood Sample No. Test | 10 | 11 | 12 | 13 |
|---|---|---|---|---|
| Wood failure by the knife test at the normal conditions (%) | 98 | 99 | 90 | 90 |
| Bonding strength** (Kg/cm²) | 18.0 | 18.8 | 18.8 | 16.8 |
| Wood failure**(%) | 67 | 74 | 60 | 64 |

**Note: Results based on the "repeated boiling test" described in the Japanese Agriculture and Forestry Standard.

COMPARATIVE EXAMPLES

The gelation time and plywood bonding strength of the adhesives prepared by the present invention using a water-soluble phenolic resin which were obtained by the description in Example 1 were compared with various adhesives lacking one of the additives, resorcinol, formaldehyde and sodium carbonate used in the present invention. The results are shown in Table 7.

Whereas, No. 14 is the basic phenolic resin itself, No. 15, No. 16 and No. 17 are phenolic resin adhesives with resorcinol of one part and para-formaldehyde of 2 parts added respectively. No. 15 is the case where there is no addition of sodium carbonate. Therefore, the effectiveness of using sodium carbonate together is distinct by comparing the difference of gelation times between No. 16 and No. 17. Also, the effectiveness of adding sodium carbonate is clear by comparison of gelation times among the three adhesives Nos. 18, 19, and 20 to which are added 3 parts of resorcinol and 3.5 parts of para-formaldehyde. But, if caustic soda is used in place of sodium carbonate herein, the gelation times are delayed on the contrary. No. 21 and No. 22 are examples of adding only sodium carbonate, and the shortening of cure speeds is not conspicuous.

The rapid curability of No. 16, No. 17, No. 19 and No. 20 adhesives prepared by the present invention became more clear by the following plywood bonding strength test. Veneers were treated with adhesives designated No. 14 to No. 22, and nine (9) plywood samples were prepared by the same bonding condition described in Example 1. The adhesive compositions are shown in Table 8.

Comparison of bonding strength of the nine plywoods was made by the "repeated boiling test" of the Japanese Agriculture and Forestry Standard (JAS) for Type 1 plywood. The results are shown in Table 8, for Boiling Test No. 1.

TABLE 7

| Glue No. Composition | 14 | 15 | 16 | 17 | 18 | 19 | 20 | 21 | 22 |
|---|---|---|---|---|---|---|---|---|---|
| Phenolic resin | 100 | 100 | 100 | 100 | 100 | 100 | 100 | 100 | 100 |
| Resorcinol | 0 | 1 | 1 | 1 | 3 | 3 | 3 | 0 | 0 |
| Para-formaldehyde | 0 | 2 | 2 | 2 | 3.5 | 3.5 | 3.5 | 0 | 0 |
| Sodium carbonate | 0 | 0 | 1 | 3 | 0 | 1 | 3 | 1 | 3 |
| Gelation time (min./110°C) | 33 | 20 | 14 | 12 | 13 | 9 | 7.5 | 25 | 21 |

TABLE 8

| Glue No. Composition | 14 | 15 | 16 | 17 | 18 | 19 | 20 | 21 | 22 |
|---|---|---|---|---|---|---|---|---|---|
| Phenolic resin | 100 | 100 | 100 | 100 | 100 | 100 | 100 | 100 | 100 |
| Resorcinol | 0 | 1 | 1 | 1 | 3 | 3 | 3 | 0 | 0 |
| Para-formaldehyde | 0 | 2 | 2 | 2 | 3.5 | 3.5 | 3.5 | 0 | 0 |
| Sodium carbonate | 0 | 0 | 1 | 3 | 0 | 1 | 3 | 1 | 3 |
| Walnut powder | 5 | 5 | 5 | 5 | 4 | 4 | 4 | 5 | 5 |
| Water | 0 | 0 | 0 | 0 | 5 | 5 | 5 | 0 | 0 |
| Extended magnification for one part of phenolic resin | 1.05 | 1.08 | 1.09 | 1.10 | 1.155 | 1.165 | 1.185 | 1.06 | 1.08 |
| Boiling Test No. 1 | X | F | P | P | F | P | P | X | X |

TABLE 8-continued

| Glue No. Composition | 14 | 15 | 16 | 17 | 18 | 19 | 20 | 21 | 22 |
|---|---|---|---|---|---|---|---|---|---|
| Boiling Test No. 2 |  | X | P | P | X | P | P |  |  |

X: Delamination, disqualified
F: Shows a bonding strength of less than 7 Kg/cm², disqualified.
P: Shows a bonding strength of more than 7 Kg/cm², qualified for Type 1 plywood.

Excluding No. 14, No. 21 and No. 22 which were delaminated in the repeated boiling test No. 1 on the plywoods prepared by using the adhesives described above, adhesives No. 15 to No. 20 were extended to about 1.6 times (against 1 part of phenolic resin) by using walnut powder, wheat flour and water, and the corresponding plywoods were again prepared by the adhesion conditions described in Example 1, and the above-described repeated boiling tests were carried out. The results are shown in Table 8 for Boiling Test No. 2.

As it is clear by these results, the adhesives which exhibited excellent rapid curability and bonding strength after being highly extended were all prepared by the present invention. For adhesive blends of Nos. 16, 17, 19 and 20, similar results were obtained by using potassium carbonate in place of sodium carbonate.

Therefore, the method of the present invention which uses resorcinol, formaldehyde and alkali metal carbonate together provides excellent phenolic resin adhesives which have rapid curability and are highly extendable.

The foregoing specification is intended to illustrate and exemplify the invention, but not to limit it. Various changes and modifications can be made in the compositions and methods of the invention without departing from the spirit and scope of the invention.

We claim:
1. An adhesive composition comprising in admixture:
    1. a water-soluble thermosetting phenolic resin which consists essentially of a condensation product of a monohydroxy-phenol and an aldehyde in a mole ratio of phenol to aldehyde of about 1:1.5 to 1:3, and
    2. a curing agent consisting essentially of resorcinol, a formaldehyde donor and an alkali metal carbonate, wherein said formaldehyde donor is in a proportion of about 1 to 10 parts by weight per 100 parts of said phenolic resin, said resorcinol is in proportion of about 1 to 5 parts by weight per 100 parts of said phenolic resin, and said alkali metal carbonate is in a proportion of about 1 to 5 parts by weight per 100 parts of said phenolic resin.
2. The adhesive composition of claim 1 wherein a portion of the phenol is replaced by urea or lignin.
3. The adhesive composition of claim 1 wherein said formaldehyde donor is formaldehyde.
4. The adhesive composition of claim 1 wherein said alkali metal carbonate is sodium carbonate.
5. The adhesive composition of claim 1 wherein the phenol and aldehyde of said phenolic resin are phenol and formaldehyde, respectively.
6. The adhesive composition of claim 1 which also contains an extender.

* * * * *

UNITED STATES PATENT OFFICE
CERTIFICATE OF CORRECTION

PATENT NO. : 3929695
DATED : Dec. 30, 1975
INVENTOR(S) : Takao Murata; Nobutaka Nakamura; Yukio Sacki It is certified that error appears in the above-identified patent and that said Letters Patent are hereby corrected as shown below:

Column 1, Line 51 "or" should read --of--; line 62, "watersoluble" should read --water-soluble--.

Column 4, Line 2 "melamineurea" should read --melamine-urea--.

Signed and Sealed this

Nineteenth Day of October 1976

[SEAL]

Attest:

RUTH C. MASON
Attesting Officer

C. MARSHALL DANN
Commissioner of Patents and Trademarks